US012802232B2

(12) United States Patent
Kundeti et al.

(10) Patent No.: US 12,802,232 B2
(45) Date of Patent: Nov. 17, 2026

(54) IMAGE SEGMENTATION METHODS AND SYSTEMS

(71) Applicant: KONINKLIJKE PHILIPS N.V., Eindhoven (NL)

(72) Inventors: Srinivasa Rao Kundeti, Movva (IN); Manikanda Krishnan V, Bangalore (IN)

(73) Assignee: KONINKLIJKE PHILIPS N.V., Eindhoven (NL)

(*) Notice: Subject to any disclaimer, the term of this patent is extended or adjusted under 35 U.S.C. 154(b) by 421 days.

(21) Appl. No.: 18/032,059

(22) PCT Filed: Oct. 12, 2021

(86) PCT No.: PCT/EP2021/078100
§ 371 (c)(1),
(2) Date: Apr. 14, 2023

(87) PCT Pub. No.: WO2022/078978
PCT Pub. Date: Apr. 21, 2022

(65) Prior Publication Data

US 2023/0386044 A1 Nov. 30, 2023

(30) Foreign Application Priority Data

Oct. 15, 2020 (EP) .................................... 20201964

(51) Int. Cl.
*G06T 7/11* (2017.01)
*G06T 7/00* (2017.01)
(Continued)

(52) U.S. Cl.
CPC .............. *G06T 7/11* (2017.01); *G06T 7/0012* (2013.01); *G06T 7/174* (2017.01); *G06T 7/187* (2017.01);
(Continued)

(58) Field of Classification Search
CPC ......... G06T 7/11; G06T 7/0012; G06T 7/174; G06T 7/187; G06T 2207/10092;
(Continued)

(56) References Cited

U.S. PATENT DOCUMENTS

2007/0167727 A1 7/2007 Menezes et al.
2013/0188846 A1 * 7/2013 Kriston .................... G06T 7/11 382/130
(Continued)

FOREIGN PATENT DOCUMENTS

KR 20200055690 A * 5/2020 ............ G16H 50/20

OTHER PUBLICATIONS

Shen, Qiang et al. "Statistical prediction of tissue fate in acute ischemic brain injury", Oct. 2005 [retrieved on Jun. 20, 2025], Journal of Cerebral Blow Flow & Metabolism [online], vol. 25, No. 10, pp. 1336-1345. Retrieved from PubMed: <URL: https://pmc.ncbi.nlm.nih.gov/articles/PMC2949953/>. (Year: 2005) <DOI: 10.1038/sj.jcbfm.9600126>. (Year: 2005).*
(Continued)

*Primary Examiner* — Matthew C Bella
*Assistant Examiner* — Nicholas John Helco

(57) ABSTRACT

According to an aspect, there is provided a computer-implemented segmentation method (100, 210), the method comprising: performing a first automated segmentation operation (400) on one or more first images of a subject area to automatically determine a first segmentation map of the subject area, wherein the one or more first images are generated using a first technique; performing, at least partially based on the first segmentation map, a second automated segmentation operation (600) on one or more second images of the subject area to automatically determine a second segmentation map of the subject area, wherein the one or more second images of the subject area are generated
(Continued)

using a second technique different from the first technique, the first and second imaging techniques to capture different properties of the subject area; automatically determining a mismatch between segmented portions of the first and second segmentation maps.

20 Claims, 7 Drawing Sheets

(51) Int. Cl.
*G06T 7/174* (2017.01)
*G06T 7/187* (2017.01)

(52) U.S. Cl.
CPC ............... *G06T 2207/10092* (2013.01); *G06T 2207/20084* (2013.01); *G06T 2207/20156* (2013.01); *G06T 2207/30048* (2013.01); *G06T 2207/30096* (2013.01)

(58) Field of Classification Search
CPC . G06T 2207/20084; G06T 2207/20156; G06T 2207/30048; G06T 2207/30096; G06T 2207/10088; G06T 7/136; G06T 7/155; G06T 7/162; G06T 7/181; G06T 7/194; G06T 2207/10084; G06T 2207/10072; G06T 2207/20081; G06T 2207/20101; G06T 2207/30004; G06T 2207/30101; G06T 2207/30104; G06T 7/215; G06V 10/457; G01N 2800/324; G01N 2800/2871
See application file for complete search history.

(56) References Cited

U.S. PATENT DOCUMENTS

| | | | | |
|---|---|---|---|---|
| 2013/0266197 | A1* | 10/2013 | Nagenthiraja | G06T 12/00 382/128 |
| 2016/0055644 | A1* | 2/2016 | Betting | A61B 5/055 382/131 |
| 2017/0270673 | A1* | 9/2017 | Øverbye | G06T 7/174 |
| 2020/0005464 | A1* | 1/2020 | Weese | G06F 17/16 |
| 2020/0381096 | A1* | 12/2020 | Zaharchuk | G06V 10/774 |
| 2021/0312614 | A1* | 10/2021 | Liu | G06T 7/11 |
| 2022/0215536 | A1* | 7/2022 | Bertges | A61B 6/032 |

OTHER PUBLICATIONS

Shen, Qiang et al. "Statistical prediction of tissue fate in acute ischemic brain injury", Oct. 2005, Journal of Cerebral Blood Flow & Metabolism [online], vol. 25, No. 10, pp. 1336-1345. <DOI: 10.1038/sj.jcbfm.9600126>. (Year: 2005).*
Kim, Yoon-Chul et al. "Novel Estimation of Penumbra Zone Based on Infarct Growth Using Machine Learning Techniques in Acute Ischemic Stroke", Jun. 24, 2020, Journal of Clinical Medicine [online], vol. 9, No. 6, article No. 1977. <DOI: https://doi.org/10.3390/jcm9061977>. (Year: 2020).*
Rekik et al., "Medical image analysis methods in MR/CT-imaged acute-subacute ischemic stroke lesion: Segmentation, prediction and insights into dynamic evolution simulation models. A critical app", NeuroImage: Clinical 1 (2012), pp. 164-178.
Malla et al., "Evaluation of Enhanced Learning Techniques for Segmenting Ischaemic Stroke Lesions in Brain Magnetic Resonance Perfusion Images Using a Convolutional Neural Network Scheme", Frontiers in Neuroinformatics, vol. 13, Article 33, May 29, 2019, doi: 10.3389/fninf.2019.00033, pp. 1-16.
Song, "Generative Model-Based Ischemic Stroke Lesion Segmentation", East China Normal University, 51151217005@stu.ecnu.edu.cn, pp. 1-9, 2019.
Ninds rt-PA Stroke Group: Tissue plasminogen activator for acute ischemic stroke. The New England Journal of Medicine, vol. 333, No. 24, pp. 1581-1587, Dec. 14, 1995.
Baron "Mapping the ischaemic penumbra with PET: implications for acute stroke treatment", Cerebrovasc Diseases 1999; 9: pp. 193-201.
Hossman, "Viability Thresholds and the Penumbra of Focal Ischemia". American Neurological Association, Neurological Progress, (1994) 36: pp. 557-565.
Ginsberg MD, Pulsinelli WA. The Ischemic Penumbra, Injury Thresholds, and the Therapeutic Window for Acute Strok, American Neurological Assocation (1994); 36: pp. 553-554.
Kidwell et al., Beyond Mismatch: Evolving Paradigms in Imaging the Ischemic Penumbra with Multimodal Magnetic Resonance Imaging. Stroke. (2003); 34, pp. 2729-2735.
Ramadan et al., "Diffusion-Perfusion Mismatch: An Opportunity for Improvement in Cortical Function" Frontiers in Neurology, vol. 5, Article 280, (2015), pp. 1-8.
Scalzo et al., "Data science of stroke imaging and enlightenment of the penumbra", vol. 6, Article 8, (2015) https://doi.org/10.3389/fneur.2015.00008, pp. 1-6.
Goyal et al., "Randomized Assessment of Rapid Endovascular Treatment of Ischemic Stroke", The New England Journal of Medicine, Mar. 15, 2015, 372(11): pp. 1019-1030. doi:10.1056/NEJMoa1414905.
Campbell et al., "Endovascular Therapy for Ischemic Stroke with Perfusion-Imagingselection", The New England Journla of Medicine (2015) 372:pp. 1009-1018. doi:10.1056/NEJMoa1414792.
Saver et al., "Solitaire™ with the Intention for Thrombectomy as Primary Endovascular Treatment for Acute Ischemic Stroke (Swift Prime) trial: protocol for a randomized, controlled, multicenter study comparing the Solitaire revascularization device with IV tPA with IV tPA alone in acute ischemic stroke", Protocols vol. 10 Apr. 2015, pp. 439-448. doi: 10.1111/ijs.12459.
Parsons et al., "A Randomized Trial of Tenecteplase versus Alteplase for Acute Ischemic Stroke", The New England Journal of Medicine, (2012); 366: pp. 1099-1107.
Takasawa et al., "How Reliable Is Perfusion MR in Acute Stroke? Validation and Determination of the Penumbra Threshold Against Quantitative PET", Stroke. (2008), vol. 39, pp. 870-877.
Zaro-Weber et al., "Maps of Time to Maximum and Time to Peak for Mismatch Definition in Clinical Stroke Studies Validated With Positron Emission Tomography", Stroke, (2010; 41: pp. 281702821), http://stroke.ahajournals.org.
Leigh et al., "A comparison of two methods for MRI classification of at-risk tissue and core infarction", Frontiers in Neurology, Sep. 3, 2014, Sep. 2014, vol. 5, Article 155, pp. 1-5.
Berkhemer et al., A Randomized Trial of Intraarterial Treatment for Acute Ischemic Stroke, The New England Journal of Medicine, (2015) 372(1): pp. 11-20. doi:10.1056/NEJMoa141158.
Hakim, "The Cerebral Ischemic Penumbra", The Canadian Journal of Neurologial Sciences, (1987); 14, pp. 557-559, https://doi.org/10.1017/S0317167100037355, Published online by Cambridge University Press.
International Search report and Written Opinion of PCT/EP2021/078100, dated Feb. 4, 2022.

* cited by examiner

IMAGE SEGMENTATION METHODS AND SYSTEMS

CROSS-REFERENCE TO PRIOR APPLICATIONS

This application is the U.S. National Phase application under 35 U.S.C. § 371 of International Application No. PCT/EP2021/078100, filed on Oct. 12, 2021, which claims the benefit of European Patent Application No. 20201964.2, filed on Oct. 15, 2020. These applications are hereby incorporated by reference herein.

FIELD OF THE INVENTION

The present disclosure relates to image segmentation methods and systems and is particularly, although not exclusively, concerned with image segmentation methods and systems for segmenting an area of an infarction within a diffusion weighted image.

BACKGROUND OF THE INVENTION

Medical images captured, for example, using Magnetic Resonance Imaging (MRI), Computed Tomography (CT) and/or Positron Emission Tomography (PET) techniques, can provide useful information to be used by medical practitioners to assist in the determination of appropriate treatments to be provided to a patient.

In particular, a mismatch between an abnormality that can be observed within an image captured using, for example, a Perfusion Weighted Imaging (PWI) MRI technique, and an area of infarction determined from an image captured using, for example, a Diffusion Weighted Imaging (DWI) MRI technique, can be used as an indication of the size of a penumbra region within a lesion of a patient suffering from an ischaemic stroke. The penumbra region may indicate an area of tissue at risk, which may benefit from reperfusion therapies.

Accurately determining the mismatch of the lesion and infarct from the PWI and DWI images is therefore an important process for informing future assessment of the patient. It is desirable to provide a system for automatically determining the mismatch between portions that may be segmented from medical images with high accuracy.

SUMMARY OF THE INVENTION

According to a first specific aspect, there is provided a computer-implemented segmentation method, the method comprising:

- performing a first automated segmentation operation, e.g. using a first artificial neural network such as a convolutional neural network, e.g. a U-Net, on one or more first images of a subject area to automatically determine a first segmentation map of the subject area, wherein the one or more first images are generated using a first technique;
- performing, at least partially based on the first segmentation map, a second automated segmentation operation, e.g. using a second artificial neural network, on one or more second images of the subject area to automatically determine a second segmentation map of the subject area, wherein the one or more second images of the subject area are generated using a second technique different from the first technique, the first and second imaging techniques to capture different properties of the subject area;
- automatically determining a mismatch between segmented portions of the first and second segmentation maps, e.g. by subtracting the first segmentation map, or portion thereof, from the second segmentation map, or portion thereof, or vice versa.

The term image used within the present specification may refer to a matrix of elements, e.g. pixels or voxels, comprising values which may be generated using an imaging technique, such as a diffusion or perfusion weighted imaging technique. Additionally or alternatively, the term image may refer to a map, e.g. matrix, of elements comprising values determined, for example, by processing an image captured using an imaging technique. For example, an image may be a map of apparent diffusion coefficient values derived from a diffusion weighted image; or a map of a Tmax (time to maximum) parameter derived from an image captured using a perfusion weighted imaging technique.

The subject area may be a volume of tissue, e.g. brain tissue. The first image segmentation operation may be a binary segmentation operation. The second image segmentation operation may be a binary segmentation operation. The second segmentation operation may be to segment a portion of the second image corresponding to a different portion of the subject area from the first segmentation. The mismatch may be determined in order to identify the penumbra of the lesion, e.g. by subtracting the infarction from the lesion.

By performing the second segmentation operation at least partially based on the first segmentation map, an accuracy of the second segmentation operation may be improve. This may, in turn, lead to a more accurate determination of the mismatch. For example, regions of interest determined using the first segmentation map may be provided as inputs to an attention function of the second artificial neural network in order to focus the attention of the second artificial neural network on the regions of interests when performing the second segmentation operation.

Performing the first segmentation operation may comprises: automatically applying one or more thresholds to: values of pixels within the one or more first images; or values of elements within one or more maps determined based on the one or more first images, to determine a plurality of zones within the one or more first images or maps; and providing the zones of the one or more first images or maps as separate inputs to a procedure, e.g. algorithm, for determining the first segmentation map.

The thresholds may be domain specific thresholds, e.g. specified based on domain knowledge, or may be determined by a procedure performing the first segmentation operation. In this way the first segmentation operation may be threshold-agnostic and may proceed automatically, e.g. without manual threshold selection by a user. By providing the zones of the one or more first images or maps as inputs to the procedure, one or more search spaces may be created and searched for useful intermediate maps that aid in the first segmentation and/or second segmentation to find single or multiple segmentation regions.

Performing the second segmentation operation at least partially based on the first segmentation map may comprise identifying one or more regions of interest within the one or more second images at least partially based on the first segmentation map. Performing the second segmentation operation at least partially based on the first segmentation map may further comprise selectively utilizing information specifying the one or more regions of interest in the second segmentation operation, e.g. as an input to an attention function of the second artificial neural network. In this way, information from the first images may inform the second segmentation operation and accuracy of the second segmentation operation may thereby be improved.

The method may comprise generating an estimated second segmentation map using a region growing procedure, e.g. algorithm, to grow regions around seed locations within one or more of the regions of interest, based one or more predetermined region growing criteria. The seed locations may be selected at least partially based on information within and/or derived from the first and/or second images at the seed locations, such as values of elements of the image, such as values of elements of the image. For example, the seed locations may be selected by comparing the information within and/or derived from the first and/or second images to one or more predetermined thresholds. The seed locations may be determined to be within a segmented portion of the first segmentation map. The seed location may be selected, e.g. randomly selected, from one or more prospective seed locations. Generating the estimated second segmentation map may comprise: selecting a plurality of seed locations; and expanding regions around the seed locations to identify regions using a reinforcement learning model. In this way, the estimated second segmentation map may be generated such that the estimated second segmentation map comprises one or more connected regions.

The first image may be a perfusion weighted image, e.g. captured using a perfusion weighted magnetic resonance imaging technique. The first segmentation operation may be to segment a portion of the subject area comprising a lesion, e.g. comprising an infarct and an area of penumbra, captured within the perfusion weighted image.

The second image may be a diffusion weighted image, e.g. captured using a diffusion weighted magnetic resonance imaging technique. The second segmentation operation may be to segment a portion of the subject area comprising an infarct captured within the diffusion weighted image.

The method may comprise predicting a rate of change of a segmented region within the first and/or second segmentation map over time based on one or more of the first image, the second image, the first segmentation map and the second segmentation map. For example, the first and/or second segmentation maps may be provided as inputs to an artificial neural network, such as a generative adversarial network trained to predict changes in segmentation maps that have been determined based on the first and second images, e.g. based on images that have been captured using the first and second imaging techniques.

The method may further comprise generating a timeline of predicted change of the segmented region. The method may comprise predicting a change in the mismatch, e.g. magnitude of the mismatch. The change of the mismatch may be determined based on one or more of the first image, the second image, the first segmentation map and the second segmentation map. The method may comprise generating a timeline of predicted change in the mismatch, e.g. magnitude of the mismatch. The method may comprise predicting a rate of change of the mismatch. The method may further comprise generating a timeline of predicted rate of change of the mismatch.

The method may comprise determining a first map of a first property, such as a haemodynamic property, e.g. Tmax, within the subject area based on the one or more first images. The first segmentation operation may be performed based on the first map, e.g. by segmenting one or more portions of the first map.

According to a second specific aspect, there is provided a machine readable medium storing instructions which, when executed by a processor, cause the processor to perform the method of any of the preceding claims.

According to a third specific aspect, there is provided an image segmentation system, the system comprising a processor and a memory storing computer readable instructions which, when executed by the processor cause the processor to:

- perform a first automated segmentation operation based on one or more first images of a subject area to automatically determine a first segmentation map of the subject area, wherein the one or more first images are generated using a first technique;
- perform, at least partially based on the first segmentation map, a second automated segmentation operation based on one or more second images of the subject area to automatically determine a second segmentation map of the subject area, wherein the one or more second images of the subject area are generated using a second technique different from the first technique, the first and second imaging techniques to capture different properties of the subject area;
- automatically determine a mismatch between segmented portions of the first and second images based on the first and second segmentation maps; and output the determined mismatch to a user of the apparatus.

The memory may store instructions which when executed by the processor cause the processor to predict a rate of change of a segmented region within the first and/or second segmentation map over time based on one or more of the first image, the second image, the first segmentation map and the second segmentation map. The memory may store instructions which when executed by the processor cause the processor to generate a timeline of predicted change of the segmented region.

The memory may store instructions which when executed by the processor cause the processor to predict a mismatch at a predetermined time after the time at which the first and/or second images were captured based on one or more of the first image, the second image, the first segmentation map and the second segmentation map. The memory may store instructions which when executed by the processor cause the processor to: output the predicted mismatch or a rate of change of the mismatch to a user of the system. The instructions may cause the processor to generate an alert to inform a user of the system if the mismatch or the rate of change of the mismatch is less than a predetermined threshold value or is greater than a predetermined threshold value.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

Figure 1:
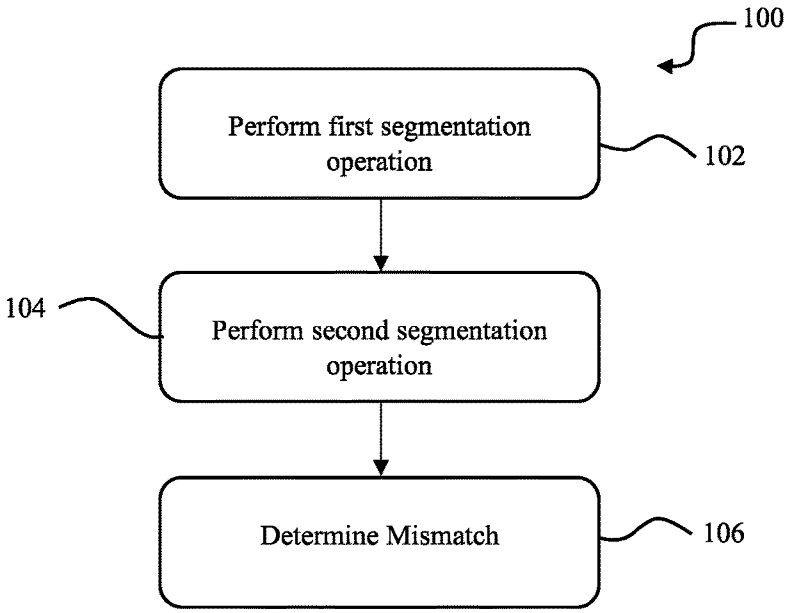
FIG. 1 is a flow chart depicting a segmentation method according to arrangements of the present disclosure.

With reference to FIG. 1, a segmentation method 100 according to arrangements of the present disclose comprises a first block 102, at which a first segmentation operation is performed. The first segmentation operation is performed on one or more first images of a subject area, e.g. captured or generated using a first imaging technique, to provide a first segmentation map of the subject area. An output of the first segmentation operation may be one or more maps corresponding to the first images in which each element, e.g. pixel or voxel, of the map comprises a value indicting a region of the segmentation map that the element is included in. In other arrangements, the segmentation map may comprise any other data structure for indicating the result of segmenting the one or more first images. The first segmentation operation may be a binary segmentation operation, which may segment the subject area into two segmented portions.

The first segmentation operation may be an automated segmentation operation performed on the one or more first images. In other words, no user input (other than providing the one or more first images) may be provided to a procedure performing the first segmentation operation, in order for the first segmentation operation to provide the first segmentation map.

The first segmentation operation may be performed at least partially using a first Artificial Neural Network (ANN), such as a Convolutional Neural Network (CNN) or Region-based CNN (R-CNN). The first ANN may be of a standard architecture known in the art. Alternatively, the first ANN may be a variation of a standard architecture. The first ANN may be implemented by using a pre-trained ANN. For example, the first segmentation operation may be performed using a pre-trained U-Net network of a standard architecture. Alternatively, the first ANN may comprise any desirable ANN, which may have been trained using sequences of images within a target input domain and labels comprising segmentation maps that have been previously determined for the images within the training sequence. The ANN may be trained using back propagation based on a loss function, e.g. a dice coefficient loss function. Alternatively, the ANN may have been trained using any other suitable method.

When the first segmentation operation is performed on more than one first image, the first images may be provided to the ANN as separate input channels. Each of the first images may be pre-processed, e.g. separately pre-processed. For example, each of the first images may be separately pre-processed as described with reference to the system 200 described below. In some arrangements, the subject area may be a 3D area, i.e. a volume, and the more than one first images may comprise cross-sections through the subject area at different respective depths. In such arrangements, the first ANN may be configured to generate a 3D segmentation map of the subject area based on the first images, e.g. in which elements of the segmentation map comprise voxels comprising values indicating the region of the segmentation map that the element is included in.

The method 100 comprises a second block 104, at which a second segmentation operation is performed on one or more second images of the subject area. The second images may be captured or generated by using a second imaging technique. The second imaging technique may be different from the first imaging technique. In particular, the second imaging technique may capture a different property or properties of the subject area compared to a property or properties captured by the first imaging technique. For example, when the first imaging technique is PWI and the second imaging technique is DWI, the first images may capture a rate of diffusion of molecules within the subject area and the second images may capture, for example, a flow rate of fluid, e.g. blood, through the subject area.

The second segmentation operation may be an automated segmentation operation performed on the one or more second images. In other words, no user input (other than providing the one or more second images and the first segmentation map) may be provided to a procedure performing the second segmentation operation in order for the procedure to provide the second segmentation map.

The second segmentation operation is performed at least partially based on the first segmentation map. For example, the first segmentation map and/or information derived from the first segmentation map may be provided as an input to a procedure performing the second segmentation operation. In particular, regions of interest within the one or more second images may be determined at least partially based on the first segmentation map. Information specifying the one or more regions of interest may be utilized in the second segmentation operation, e.g. in order to focus attention of a procedure performing the second segmentation operation. The first segmentation map may at least partially define an attention map used in the second segmentation operation. For example, the first segmentation map, or regions of interest extracted from the first segmentation map, may be used as the attention map. Alternatively, the attention map may be determined at least partially based on the first segmentation map.

In one or more arrangements, e.g. as described below, an estimated second segmentation map may be generated using a region growing procedure to grow regions around seed locations within one or more of the regions of interest within the one or more second images. The second segmentation operation may be performed at least partially based on the estimated second segmentation map. For example, the one or more second images (or maps derived from the second images) and the estimated second segmentation map may be provided as separate inputs to a procedure for performing the second segmentation operation.

The second segmentation operation may be performed at least partially using a second ANN, such as a CNN. The ANN may be structured to receive the one or more second images, one or more maps derived from the second image and/or information derived from the first segmentation map, e.g. the estimated second segmentation map, and output the second segmentation map. Examples of suitable network architectures of the second ANN are described below with reference to FIGS. 8*a*, 8*b* and 8*c*.

The second ANN may be trained using training sequences comprising images within a target input domain, information representative of the information that may be derived from a corresponding first segmentation map, and labels comprising segmentation maps that have been determined for the images within the training sequence. The network may be trained using a back propagation procedure based on a loss function, such as a dice coefficient loss function. Alternatively, the network may be trained using any other suitable training procedure.

The method 100 comprises a third block 106, at which a mismatch between segmented portions of the first and second segmentation maps is determined, e.g. automatically determined (without further input from a user). For example, the mismatch may be determined by subtracting a segmented portion of the second segmentation map (or portion thereof) from a segmented portion of the first segmentation map (or portion thereof) or vice versa. In some arrangements, the method may comprise outputting the mismatch, e.g. a magnitude of an area or volume of the mismatch, to a user.

Figure 2:
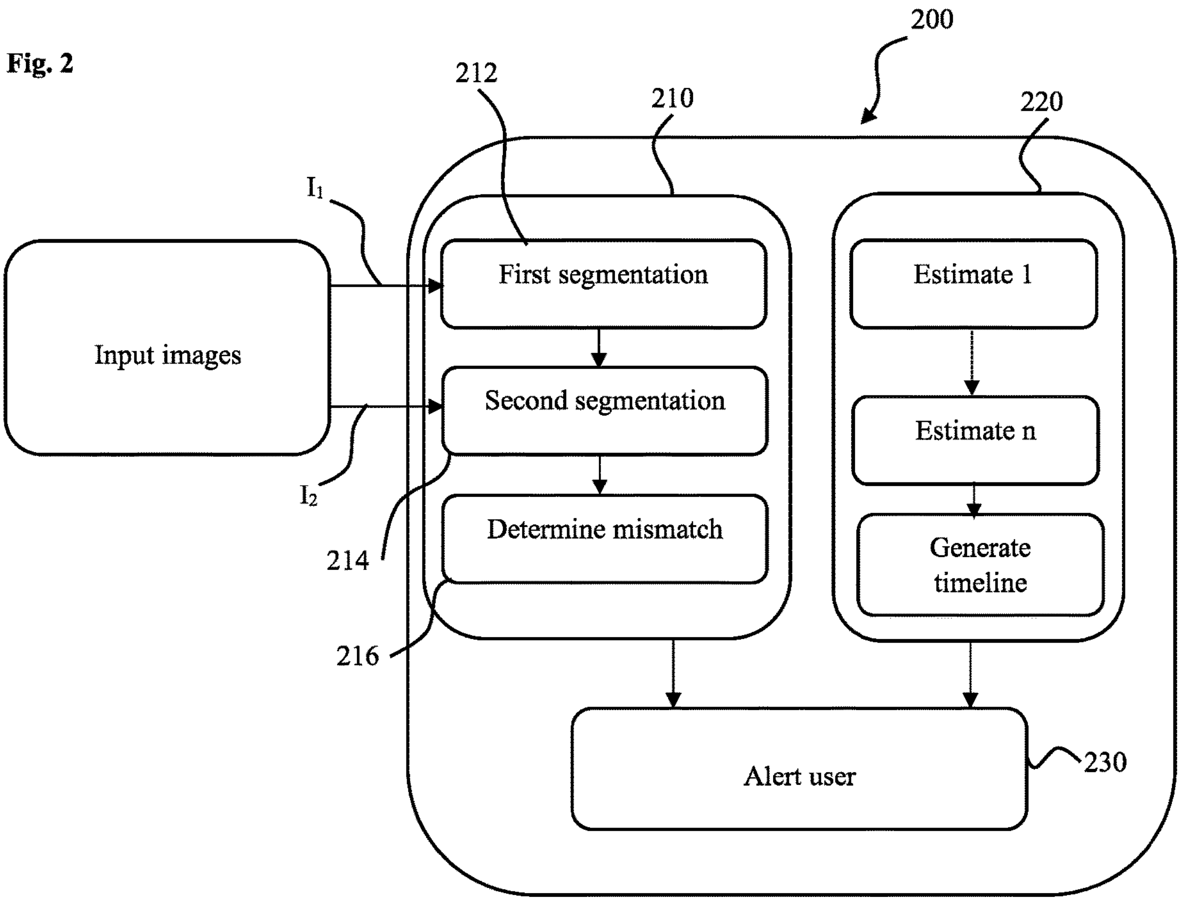
FIG. 2 is a schematic functional block diagram of a system according to arrangements of the present disclosure.

FIG. 2 is a functional block diagram illustrating a system 200 for alerting a user to a change or rate of change in a penumbra, e.g. size of the penumbra, of a lesion resulting from an ischaemic stroke. The system 200 comprises an arrangement of the segmentation method 100 described above with reference to FIG. 1. Functions of the system 200 corresponding to steps of the method 100 will become apparent from the description of the system 200 provided below. Furthermore, it will be appreciated that, features described in relation to the system 200 below may apply generally to the corresponding steps of the method 100. Although the system 200 is configured to operate on medical images captures using medical imaging techniques, in other arrangements a system comprising the method 100 may be configured to operate on images captured using any other imaging techniques, included non-medical imaging techniques, e.g. when the system is for use in a non-medical field.

As illustrated, the system 200 is configured to receive first and second medical images $I_1$, $I_2$ of a subject area, e.g. a volume of brain tissue, as inputs to the system. As described above with reference to FIG. 1, the first and second images may be captured using different imaging techniques, e.g. for capturing different properties of the subject area. In the arrangement herein described, the first medical images $I_1$ comprise images captured using Perfusion Weighted Imaging (PWI) technique, such as a perfusion weighted Magnetic Resonance Imaging (MRI) technique and the second medical images $I_2$ comprise images captured using Diffusion Weighted Imaging (DWI) such as a diffusion weighted MRI technique. However, in other arrangements, the first and second medical images may be captured using any other imaging technique, such as CT and/or PET imaging techniques.

The system 200 comprises a mismatch estimation block 210 at which a mismatch between anomalies detectable within the first and second medial images $I_1$, $I_2$ is determined, e.g. automatically determined. The function performed at the mismatch estimation block 210 may be performed using the segmentation method 100 described above. The mismatch estimation block 210 may comprise a first segmentation block 212 at which an anomaly detectable from the first medical images $I_1$ is segmented. An anomaly detectable from PWI images may correspond to the lesion, e.g. the combination of the infarct and penumbra regions of the lesion, within the subject area. The first segmentation block 212 may comprise the first block 102 of the method 100 and the features described in relation to the first block 102 may apply equally to the first segmentation block 212 and vice versa.

Figure 3:
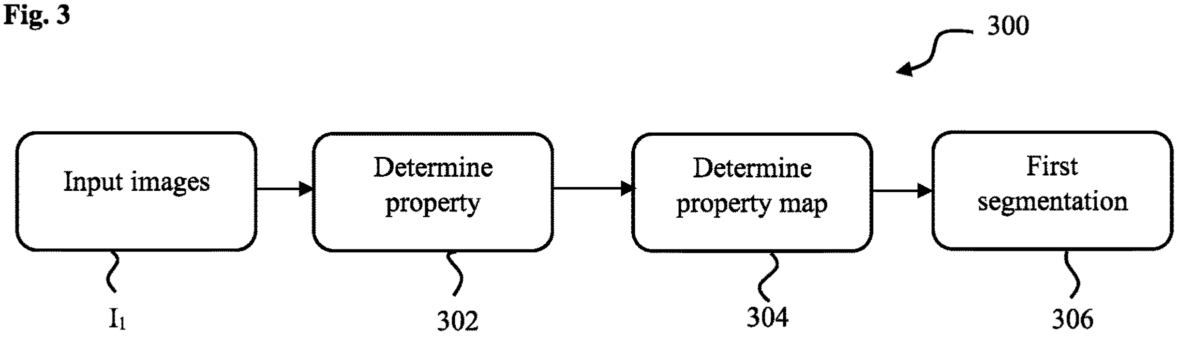
FIG. 3 is a flow chart depicting a first segmentation method according to arrangements of the present disclosure.

With reference to FIG. 3, a first segmentation method 300, which may be performed at the first segmentation block 212, will now be described. The first segmentation method 300 may comprise deriving one or more first maps $M_1$ of one or more properties, e.g. haemodynamic properties, within the subject area from the first medical images $I_1$. In the arrangement shown, at a first block 302 of the method 300 an arterial input function is derived from the PWI images, which is used to generate one or more first property maps $M_1$ at a second block 304. The one or more first property maps may comprise a map of a time to maximum (Tmax) property of the PWI images.

The first property maps $M_1$ of the subject area may be derived by processing the one or more first medical images $I_1$ using an ANN, such as a CNN. For example, the PWI images may be input to a CNN trained to process the PWI images to derive the arterial input function based on which the haemodynamic parameters may be determined to populate the first property maps $M_1$.

The first segmentation method 300 may further comprise a third block 306, at which the one or more first medical images $I_1$ and/or the one or more first property maps $M_1$ of the haemodynamic parameters within the subject area are processed in order to produce the first segmentation map.

Figure 4:
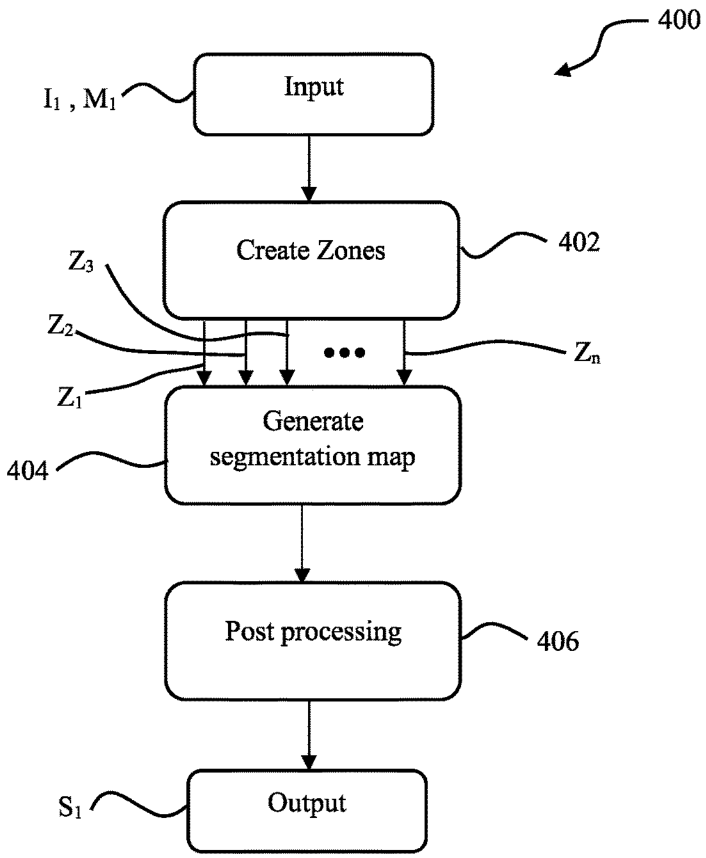
FIG. 4 is a flow chart showing detail of a step of the first segmentation method shown in FIG. 3.

FIG. 4 is a flow chart illustrating an arrangement of a first segmentation operation 400 which may be performed at the third block 306 in order to generate the first segmentation map. As depicted, the first segmentation operation 400 may comprise a first block 402 at which a plurality of thresholds are applied to values within one or more of the first property maps $M_1$, in order to extract a plurality of zones $Z_1$, $Z_2$, $Z_3$ . . . $Z_n$ of the first property maps and/or the first medical images $I_1$. For example, at the first block 402, zones of the first medical images $I_1$ corresponding to Tmax values of greater than 8 seconds, between 6 and 8 seconds, between 4 and 6 seconds and between 2 and 4 seconds may be extracted from the first medical images. In some arrangements, the thresholds may be selected based on domain knowledge. In other words, the thresholds may correspond to thresholds that are known to be relevant to the interpretation of images of the same type as the first medical images $I_1$ and/or the first property maps $M_1$ by practitioners who specialize in such interpretation. In FIG. 4, information relating to four zones $Z_1$, $Z_2$, $Z_3$, $Z_n$ are depicted as being extracted. However, in other arrangements any number of zones may be extracted, such as two, three, or more than four zones.

At a second block 404 of the first segmentation operation 400, the plurality of zones of the first property maps $M_1$ and/or first medical images $I_1$ may be provided as inputs, e.g. at separate respective input channels, to a procedure for generating the first segmentation map. The procedure may comprise propagating the inputs through an ANN, such as a U-Net network that has been trained to segment the first medical images $I_1$, e.g. PWI images. Providing the plurality of zones to the artificial neural network as separate input channels may assist the network in accurately segmenting the first medical images $I_1$, by better enabling the network to give different levels of focus to each of the zones and by enabling different weights to be given to nodes operating on features extracted from each of the zones. Furthermore, by providing the plurality of zones to the ANN as separate input channels, the ANN can generate the first segmentation map automatically in a manner that is agnostic of a threshold that may have been selected by a practitioner manually interpreting the first medical images $I_1$. Moreover, this may enable the ANN to accurately generate the first segmentation map without requiring the threshold to be selected, e.g. manually selected, by a user.

The first segmentation operation 400 may comprise a third block 406 at which one or more post-processing operations are performed on the first segmentation map generated by the procedure at the second block 404. As described above, in some arrangements, the procedure may be configured to generate a 3D segmentation map based on the first images and, at the third block 406, the 3D segmentation map may be processed, e.g. using one or more morphological operations, in order to, for example, remove holes or other artefacts from the first segmentation map. As depicted in FIG. 4, the first segmentation map $S_1$ may be output from the third block 406.

Returning to FIG. 2, the mismatch estimation block 210 may further comprise a second segmentation block 214. At the second segmentation block 214, an anomaly detectable from the second medical images $I_2$ is segmented from the images. An anomaly detectable from DWI images may correspond to an infarct within the subject area. The second segmentation block 214 may comprise the second block 104 of the method 100 and the features described in relation to the second block 104 may apply equally to the second segmentation block 214 and vice versa.

Figure 5:
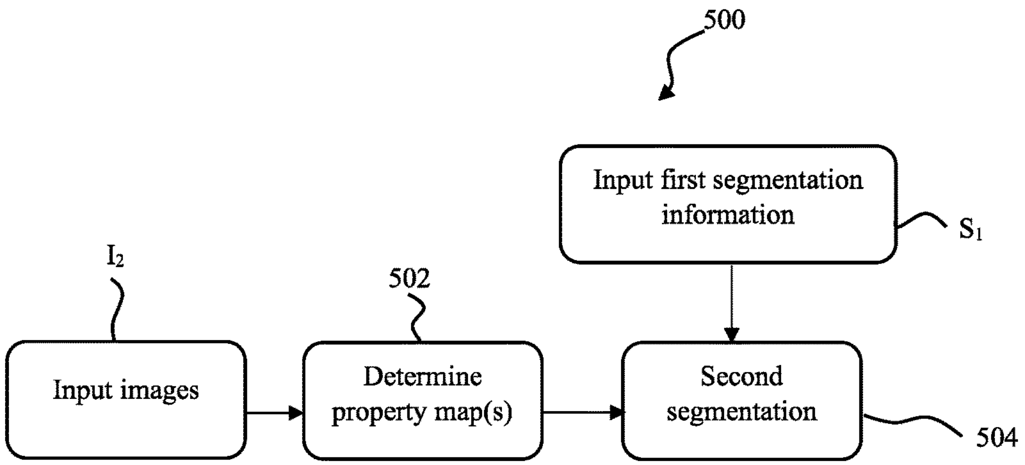
FIG. 5 is a flow chart depicting a second segmentation method according to arrangements of the present disclosure.

With reference to FIG. 5, an arrangement of a second segmentation method 500, which may be performed at the second segmentation block 214, will now be described. The second segmentation method 500 may comprise a first block 502, at which one or more second maps $M_2$ of properties within the subject area, that are derivable from the second medical images $I_2$ may be determined. For example, at the first block 502, one or more second property maps $M_2$ of Apparent Diffusion Coefficient (ADC) within the subject area may by derived from the DWI images.

The second segmentation method 500 further comprises a second block 504, at which the second medical images may be segmented in order to generate a second segmentation map $S_2$. As shown in FIG. 5, the first segmentation map $S_1$ is provided as an input to the second segmentation operation, e.g. to the second block 504.

Figure 6:
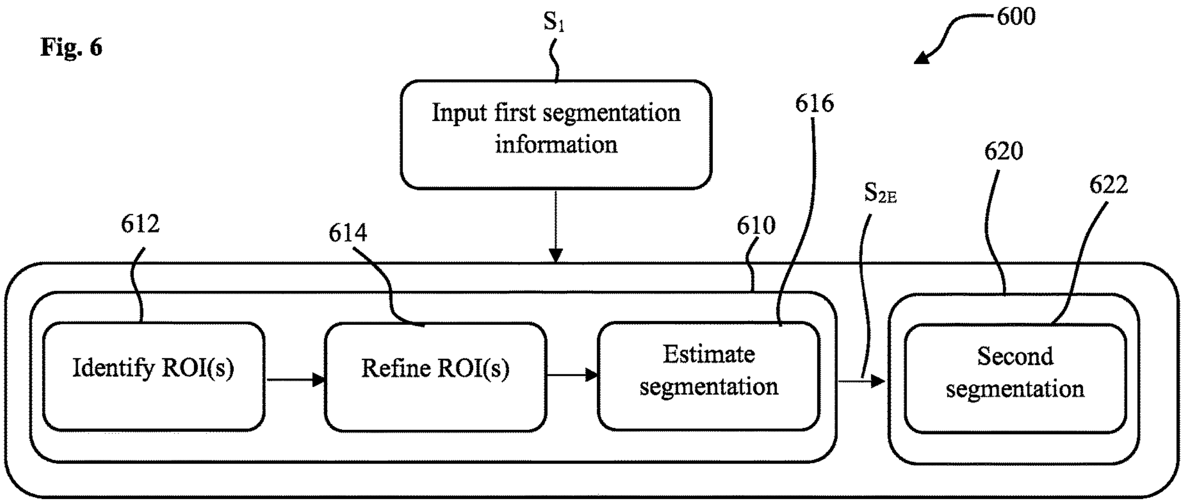
FIG. 6 is a flow chart depicting a second segmentation operation, which may performed as part of the second segmentation method illustrated in FIG. 5.

FIG. 6 is a flow chart illustrating an arrangement of a second segmentation operation 600, which may be performed at the second block 504 of the second segmentation method 500. As depicted, the second segmentation operation 600 may comprise a first part 610, at which an estimated, or potential, second segmentation map $S_{2E}$ is generated, e.g. at least partially based on the first segmentation map $S_1$, and a second part 620 at which the (final) second segmentation map $S_2$ is generated. The second segmentation map may be generated at the second part 620 at least partially based on the estimated second segmentation map $S_{2E}$.

As depicted in FIG. 6, the first part 610 may comprise a first block 612, at which one or more Regions Of Interest (ROIs) within the second medial images $I_2$ are identified; a second block 614, at which the one or more ROIs are refined; and a third block 616 at which the estimated, or potential, segmentation map $S_{2E}$ is generated.

Figure 7A:
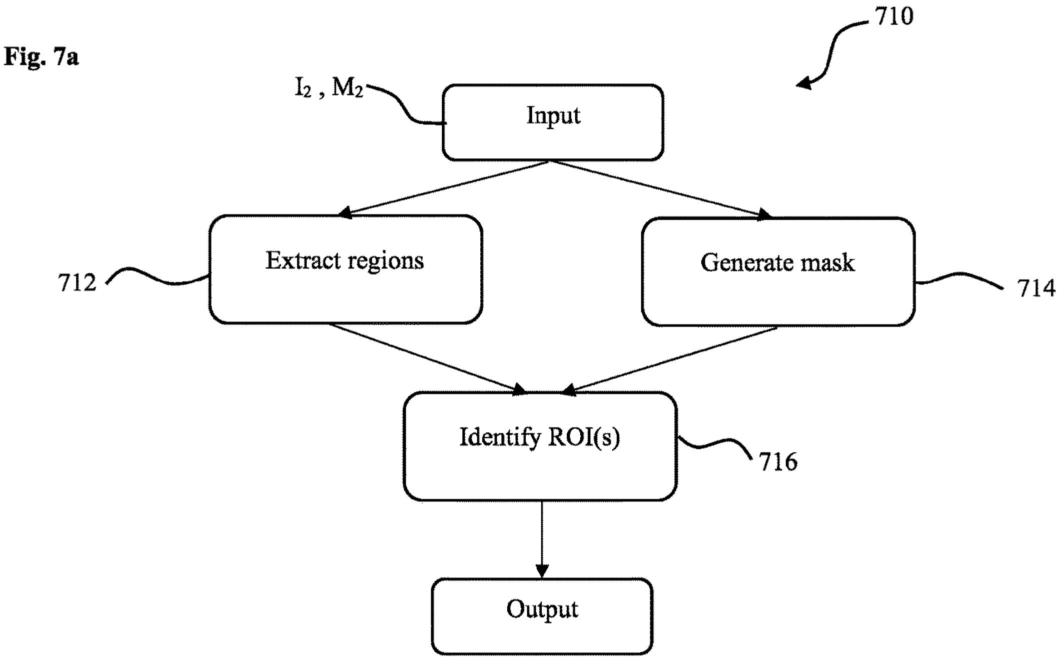
FIG. 7*a* is a flow chart showing details of one of the block of the method shown in FIG. 6.

With reference to FIG. 7*a*, an example ROI identification method 710, which may be performed at the first block 612, will now be described. The ROI identification method 710 may comprise a first block 712 at which one or more regions are extracted from the second medial images $I_2$ based on values, e.g. brightness levels, of elements, e.g. pixels, within the second medical images $I_2$. For example, the brightness levels of pixels within the second medial images $I_2$ may be compared to a threshold brightness level, and regions may be extracted from the second medical image in which the pixels have brightness levels greater than the threshold brightness level.

The ROI identification method 710 may further comprise a second block 714, at which a mask, e.g. to be applied to the second medial images, is determined based on the second parameter map $M_2$, e.g. the map of ADC, derived from the second medical images. For example, the mask may be determined by identifying regions of the second parameter map in which the value of the parameters is less than a threshold value, greater than a threshold value and/or equal to a threshold value, and/or is within or outside of one or more threshold ranges. In one arrangement, the mask may be determined by identifying regions of the second parameter map $M_2$ in which ADC is less than $600 \times 10^{-6}$ mm$^2$.

The ROI identification method 710 may further comprise a third block 716, at which the regions extracted at the first block 712 and regions of the second medical images defined by the mask determined at the second block 714 may be merged, in order to identify the ROI(s). For example, the regions may be merged by adding the regions, by intersecting the regions or by any other desirable method. The ROI(s) identified at the third block 716 may be output from the ROI identification method 710.

Figure 7B:
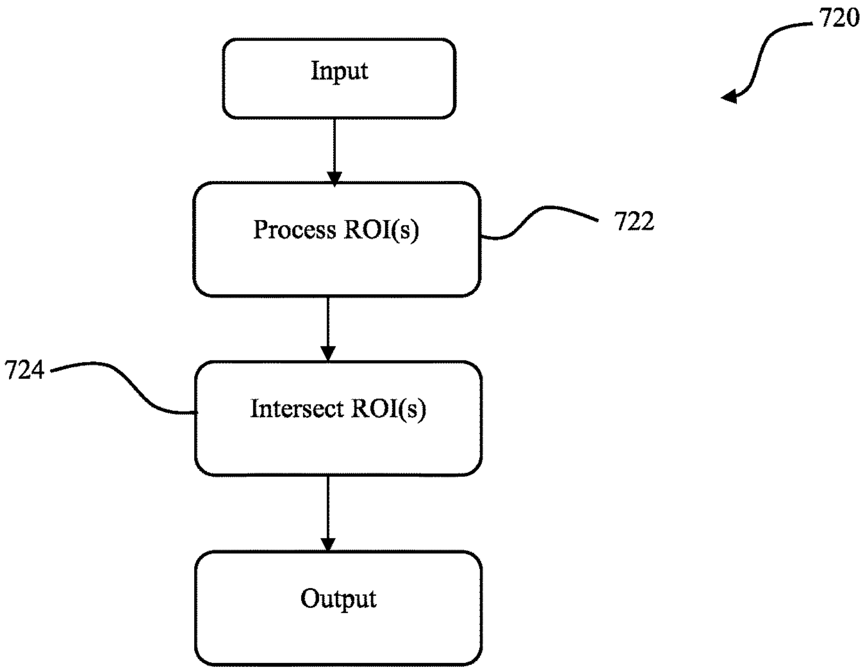
FIG. 7*b* is a flow chart showing details of another of the blocks of the method shown in FIG. 6.

Referring now to FIG. 7*b*, an example of a ROI refinement method 720, which may be performed at the second block 614 of the first part 610 of the second segmentation operation 600, will now be described. The one or more ROIs identified at the first block 612, e.g. by the ROI identification method 710, may be provided as inputs to the ROI refinement method 720. Additionally, the first segmentation map $S_1$ determined in the first segmentation method 300 may be provided as an input to the ROI refinement method 720.

The ROI refinement method 720 may comprise a first block 722, at which the one or more ROI(s) are processed, e.g. by performing one or more morphological operations on the one or more ROIs identified by the ROI identification method 710, For example, a dilation operation and/or an erosion operation may be performed on the ROIs, e.g. in order to remove holes or other artefacts from the ROIs.

The ROI refinement method 720 may comprise a second block 724, at which the ROI(s) are intersected with a segmented portion of the first segmentation map $S_1$, e.g. in order to ensure that the ROI(s) contain only regions that are within a segmented portion of the first segmentation map. In this way, information from the first medical images may be incorporated to improve the estimation of the second segmentation map $S_2$. In an arrangement in which the second segmentation operation is being performed in order to segment an infarct from a subject area of brain tissue within a DWI image, intersecting the ROIs with the segmented region of the first segmentation map, may ensure that the ROIs are within, e.g. entirely within, the lesion that has been determined by segmenting a PWI image of the subject area. The refined ROIs generated by the ROI refinement method 720 maybe output from the second block 724.

Figure 7C:
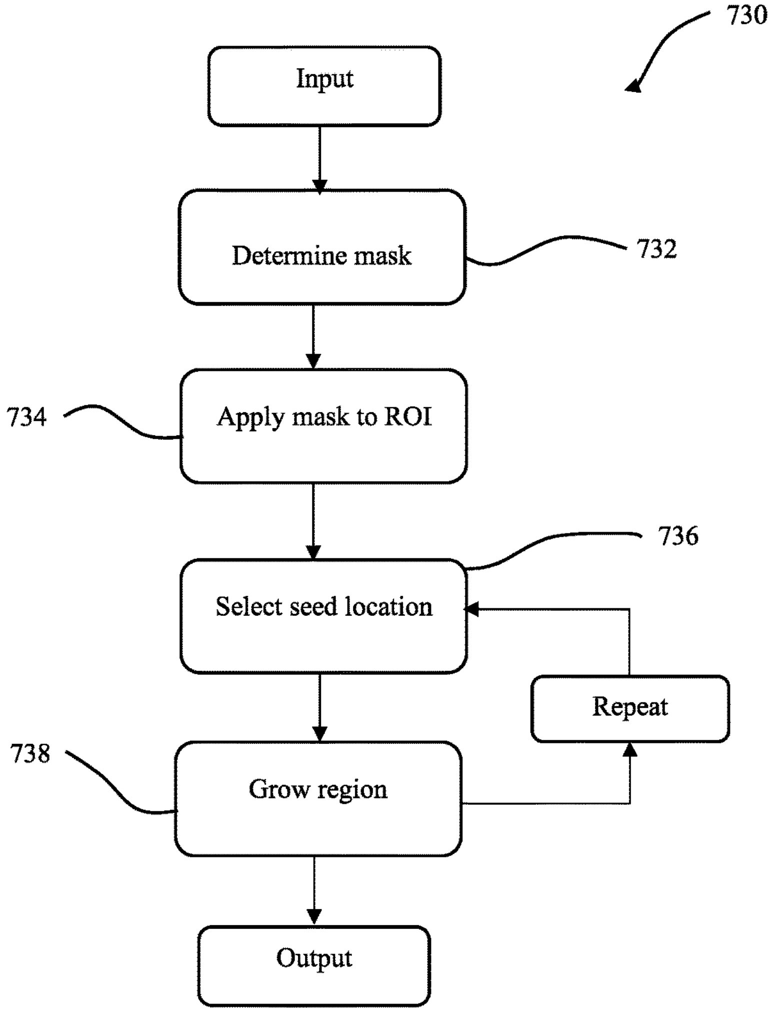
FIG. 7*c* is a flow chart showing details of one option for performing a further one of the blocks shown in FIG. 6.

With reference to FIG. 7*c*, an example first segmentation estimation method 730 will now be described. The first segmentation estimation method 730 may be performed at the third block 616 of the second segmentation operation 600. The refined ROIs generated at the second block 614 of the second segmentation operation 600 may be provided as an inputs to the first segmentation estimation method 730. In some arrangements, the first parameter map $M_1$, e.g. generated during the first segmentation method 300 as described above, may also be provided as an input to the first segmentation estimation method 730. In some arrangements, the first segmentation estimation method 730 may receive an input in defining a number of regions that a segmented portion of the estimated segmentation map $S_{2E}$ to be generated by the first segmentation estimation method 730 may be comprised of.

The first segmentation estimation method 730 may comprise a first block 732 at which a mask, e.g. to be applied to the one or more refined ROIs, is determined based on the first parameter map $M_1$. For example, the mask may be determined by identifying regions of the first parameter map in which the value of the parameter is less than a threshold value, greater than a threshold value and/or equal to a threshold value, and/or is within or outside of one or more threshold ranges. In one arrangement, the mask may be determined by identifying regions of the first parameter map $M_1$ in which Tmax is greater than 8 seconds.

At a second block 734 of the first segmentation estimation method 730, the mask determined at the first block 732 may be applied to, e.g. intersected with, the refined one or more ROIs, e.g. in order to identify the portions of the ROIs in which Tmax is greater than 8 seconds.

The first segmentation estimation method 730 may comprise a third block 736, at which a seed location is selected within the intersection of the refined ROIs identified at the second block 734. In some arrangements, the seed may be selected using a randomized process. In a fourth block 738, a region may be grown around the selected seed location based on values of the elements, e.g. pixels, of the second medical images $I_2$. For example, the values of the elements of the second medical images $I_2$ adjacent to the seed location (or elements already added to the region being grown) may be compared to a value at the seed location (or element already added to the region being grown) based on one or more region growing criteria, and the elements may be added to the region being grown if the one or more region growing criteria are met.

The third and fourth blocks 736, 738 of the first segmentation estimation method 730 may be repeated a number of times, e.g. based on the input n, in order to grow a desirable number of regions within the refined ROIs.

The combination of the regions grown during each repetition of the third and fourth block 736, 738 may be output from the first segmentation estimation method 730 (and the third block 616 of the first part 610 of the second segmentation operation 600) as the estimated second segmentation map $S_{2E}$.

Figure 7D:
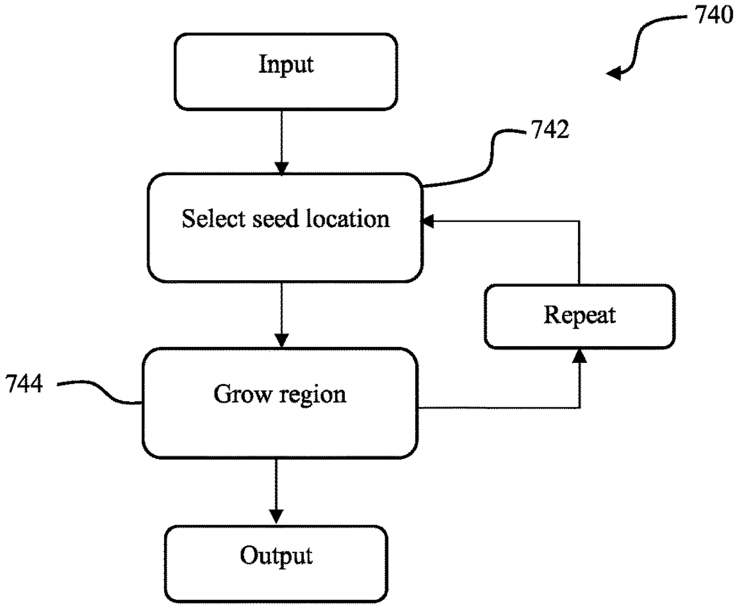
FIG. 7*d* is a flow chart showing details of another option for performing a further one of the blocks shown in FIG. 6.

With reference to FIG. 7*d*, an example second segmentation estimation method 740 will now be described. The second segmentation estimation method 740 may be performed at the third block 616 of the second segmentation operation 600, e.g. as an alternative to the first segmentation estimation method 730. As depicted in FIG. 7*d*, the refined ROIs generated at the second block 614 of the second segmentation operation 600 may be provided as an input to the second segmentation estimation method 740. In some arrangements, the second parameter map $M_2$, e.g. determined at the first block 502 of the second segmentation method 500, may also be provided as an input to the segmentation estimation method 740. In some arrangements, the second segmentation estimation method 740 may receive an input in defining a number of regions that a segmented portion of the estimated segmentation map to be generated by the second segmentation estimation method 740 may be comprised of.

The second segmentation estimation method 740 may comprise a first block 742, at which one or more seed locations are identified within one or more refined ROIs. The determined, e.g. optimally determined, ROIs from seed locations are grown to determine potential infarcts. The seed location may be determined using a reinforcement learning procedure, which may be configured to select seed locations in order to optimize regions grown, based on any desirable optimization criteria selected in order to limit a distance metric compared with ground truth data. The seed location may be selected by the reinforcement learning model at least partially based on the second parameter map $M_2$. A reward function may be formulated to select the seeds, e.g. optimal seeds, in such a way that multiple seeds are navigated to the optimal region of interest with any desirable distance based optimization function, with the error being minimized when the seed position is optimally selected. In one or more arrangements, the seed locations may be identified or selected using a Deep Q-learning network of a standard architecture.

The second segmentation estimation method 740 may further comprise a second block 744, at which a region is grown around the selected seed location based on values of the elements, e.g. pixels, of the second medical images $I_2$. The region around the selected seed location may be grown using the region growing procedure used at the fourth block 738 of the first segmentation estimation method 730. Alternatively, the region around the selected seed location may be grown using an alternative region growing procedure, e.g. applying different region growing criteria.

The first and second blocks 742, 744 of the second segmentation estimation method 740 may be repeated a number of times, e.g. based on the input n, in order to grow a desirable number of regions within the one or more refined ROI(s).

The combination of the regions grown during each repetition of the first and second blocks 742, 744 may be output from the second segmentation estimation method 740 (and the third block 616 of the second segmentation operation 600) as the estimated second segmentation map $S_{2E}$.

Returning to FIG. 6, the second part 620 of the second segmentation operation 600 comprises a second segmentation block 622, at which the second segmentation map $M_2$ is generated based on the second medical images $I_2$, e.g. in order to identify a segmented portion of the subject area corresponding to an infarct. The second segmentation map may be generated at the second segmentation block 622 by providing one or more of the second medical images $I_2$, the second parameter map $M_2$ and the estimated second segmentation map $S_{2E}$ as inputs, e.g. separate inputs, to an ANN, such as a CNN. For example, the second medical images $I_2$, the second parameter map $M_2$ and the estimated second segmentation map $S_{2E}$ may be provided to the ANN as separate input channels.

Figure 8A:
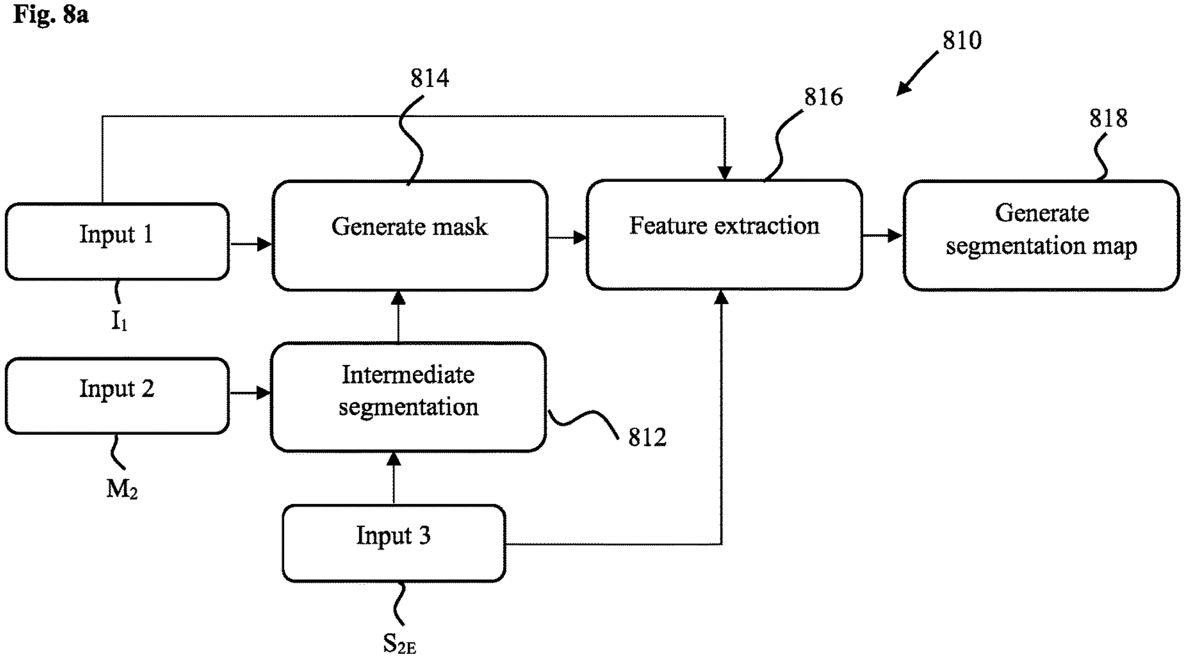
FIG. 8*a* is a schematic diagram illustrating a machine learning model for performing part of the method illustrated in FIG. 6.

With reference to FIG. 8*a*, an example first ANN 810 for performing the second segmentation operation at the second segmentation block 622 may comprise a first portion 812 comprising one or more layers, configured to receive the second parameter map $M_2$ and the estimated second segmentation map $S_{2E}$ as inputs and operate on the receive inputs to produce an intermediate segmentation map.

The first ANN 810 may comprise a second portion 814 configured to receive the intermediate segmentation map and the second medical images $I_2$ and perform one or more morphological operations such as a dilation operation, on the inputs, e.g. to produce dilated masks of the inputs.

The first ANN 810 may further comprise a third portion 816 comprising one or more layers, e.g. feature extraction layers, such as convolutional layers, configured to receive the dilated mask of the intermediate segmentation map and the second medical images, the second medical images $I_2$ and the estimated second segmentation map $S_{2E}$, and perform feature extraction on the inputs.

The first ANN 810 may further comprise a fourth portion 818 comprising one or more layers, e.g. fully connected layers, configured to receive the output from the third portion 816, e.g. from the feature extraction layers, and generate the second segmentation map $S_2$. The second segmentation map may be output from an output layer of the fourth portion 818.

The first ANN 810 may be trained end to end. Alternatively, one or more of the portions of the first ANN may be trained individually, e.g. using suitable training data reflecting the part of the segmentation process being performed by the particular portion being trained.

Figure 8B:
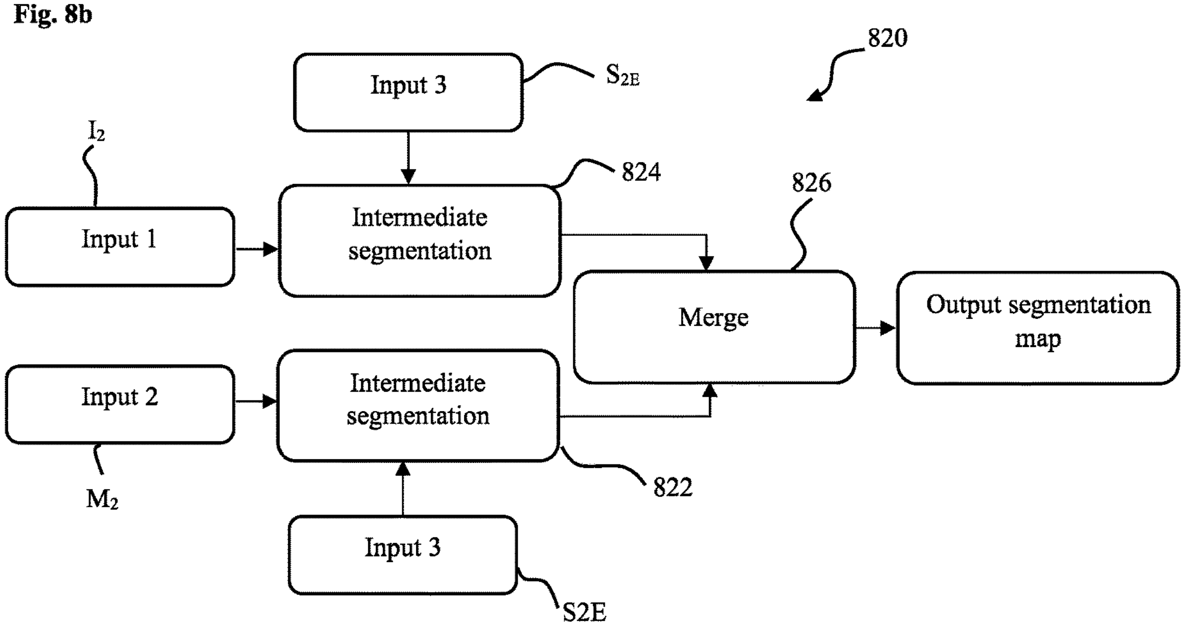
FIG. 8*b* is a schematic diagram illustrating another machine learning model for performing part of the method illustrated in FIG. 6.

With reference to FIG. 8*b*, an example second ANN 820 for generating the second segmentation map at the second segmentation block 800, e.g. as an alternative to the first ANN 810, will now be described. The second ANN 820 may comprise a first portion 822 comprising one or more layers, such as one or more convolutional layers and/or one or more fully connected layers, configured to receive the estimated second segmentation map $S_{2E}$ and the second medical images $I_2$ as inputs and generate a first intermediate segmentation map.

The second ANN 820 may comprise a second portion 824 comprising one or more layers, such as one or more convolutional layers and/or one or more fully connected layers, configured to receive the estimated second segmentation map $S_{2E}$ and the second property map $M_2$ as inputs and generate a second intermediate segmentation map.

The second ANN 820 may comprise a third portion 826 comprising one or more layers, such as one or more convolutional layers and/or one or more fully connected layers, configured to receive the estimated second segmentation map $S_{2E}$, the first intermediate segmentation map and the second intermediate segmentation map and to merge the first and second segmentation maps to generate the second segmentation map. The second segmentation map may be output from an output layer of the third portion 826.

The second ANN 820 may be trained end to end. Alternatively, one or more of the portions of the second ANN may be trained individually, e.g. using suitable training data reflecting the part of the segmentation process being performed by the particular portion being trained.

Figure 8C:
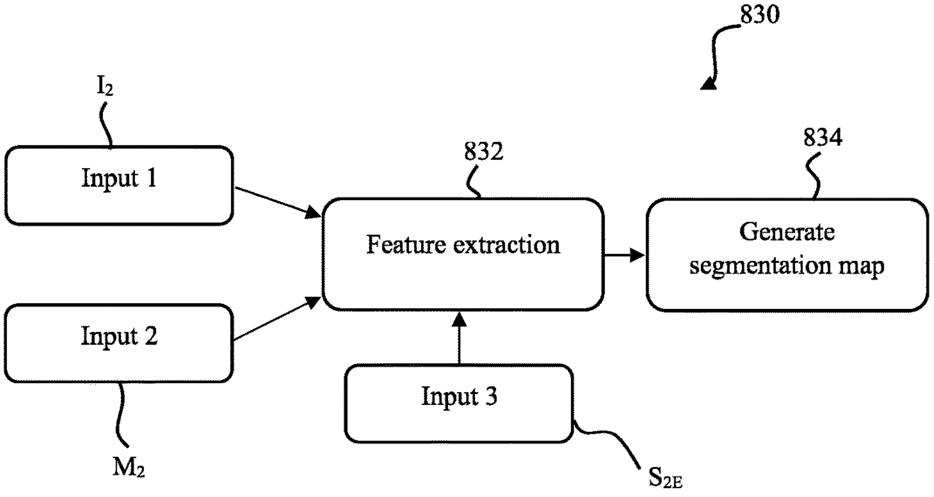
FIG. 8*c* is a schematic diagram illustrating another machine learning model for performing part of the method illustrated in FIG. 6.

With reference to FIG. 8*c*, an example third ANN 830 for generating the second segmentation map at the second segmentation block 800, e.g. as an alternative to the first and second ANNs 810, 820, will now be described. The third ANN may comprise a first portion 832 comprising one or more layers, e.g. feature extraction layers, such as convolutional layers, configured to receive the estimated second segmentation map $S_{2E}$, the second property map $M_2$ and the second medical images $I_2$ as inputs, e.g. as separate input channels to the ANN, and perform feature extraction on the inputs.

The third ANN 830 may comprise a second portion 834 comprising one or more layers, e.g. fully connected layers, configured to receive the output of the feature extraction layers of the first portion 832 and generate the second segmentation map $S_2$. The second segmentation map may be output from an output layer of the second portion 834.

The third ANN 830 may be trained end to end. Alternatively, one or more of the portions of the third ANN may be trained individually, e.g. using suitable training data reflecting the part of the segmentation map generation process being performed by the particular portion.

Returning the FIG. 2, the mismatch estimation block 210 further comprises a mismatch determination block 216, at which a mismatch is determined based on the first and second segmentation maps $S_1$, $S_2$. For example, the mismatch may be determined by subtracting a segmented portion of the second segmentation map $S_2$, e.g. corresponding to the infarct, from a segmented portion of the first segmentation map $S_1$, e.g. corresponding to the lesion. In this way, the mismatch may correspond to an area of penumbra of the lesion. The mismatch determination block may comprise the third block 106 of the method 100.

The mismatch determined at the mismatch estimation block 210 may correspond to a mismatch at a time at which the first and second medical image $I_1$, $I_2$ were determined. It may be desirable to determine, e.g. predict, a mismatch at a predetermined period of time after the time at which the first and second medical images were captured. However, it may be undesirable to repeat the process of capturing the first and second medical images.

The system 200 may further comprise a future mismatch prediction block 220 at which a predicted first segmentation map, a predicted second segmentation map and/or a predicted mismatch at a predetermined time after the time at which the first and/or second images were captured is determined. The predicted first segmentation map, predicted second segmentation map and/or predicted mismatch may be determined based on one or more of the first medical images $I_1$, the second medical images $I_2$, the first segmentation map $S_1$, the second segmentation map $S_2$ and the mismatch.

In some arrangements, the predicted first segmentation map, predicted second segmentation map and/or predicted mismatch may be determined using a Generative Adversarial Network (GAN) having any desirable structure that has been trained to generate the predicted first segmentation map, predicted second segmentation map and/or predicted mismatch. The GAN may be trained using any desirable training method, such as an unsupervised learning method, a semi-supervised learning method or a fully supervised learning method. For example, the GAN may be trained using a training sequence comprising example first and second segmentation maps that have been determined from first and second medical images captured at a first time, and labels comprising first and second segmentation maps that have been generated based on first and second medical images captured at a second time that is a predetermined period of time after the first time.

In some arrangements, the mismatch prediction block 220 may be configured to determine a plurality of predicted first segmentation maps, predicted second segmentation maps and/or a predicted mismatches at a plurality of predetermined times after the time at which the first and/or second images were captured, in order to establish a timeline of the progression of the first segmentation map, the second segmentation map and/or the mismatch.

The system 200 may further comprise a mismatch alert block 230 configured to inform a user of the system 200 of a current mismatch value and/or one or more values of future predicted mismatch values from the timeline of mismatch values determined at the mismatch prediction block. In some arrangements, the mismatch alert block 230 may be configured to generate an alert for the user of the system 200 if the current mismatch or a future estimated mismatch, e.g. a size of the mismatch or a future estimated mismatch, is below a threshold value or a rate of change of the mismatch, e.g. the size of the mismatch, is above a threshold rate.

Figure 9:
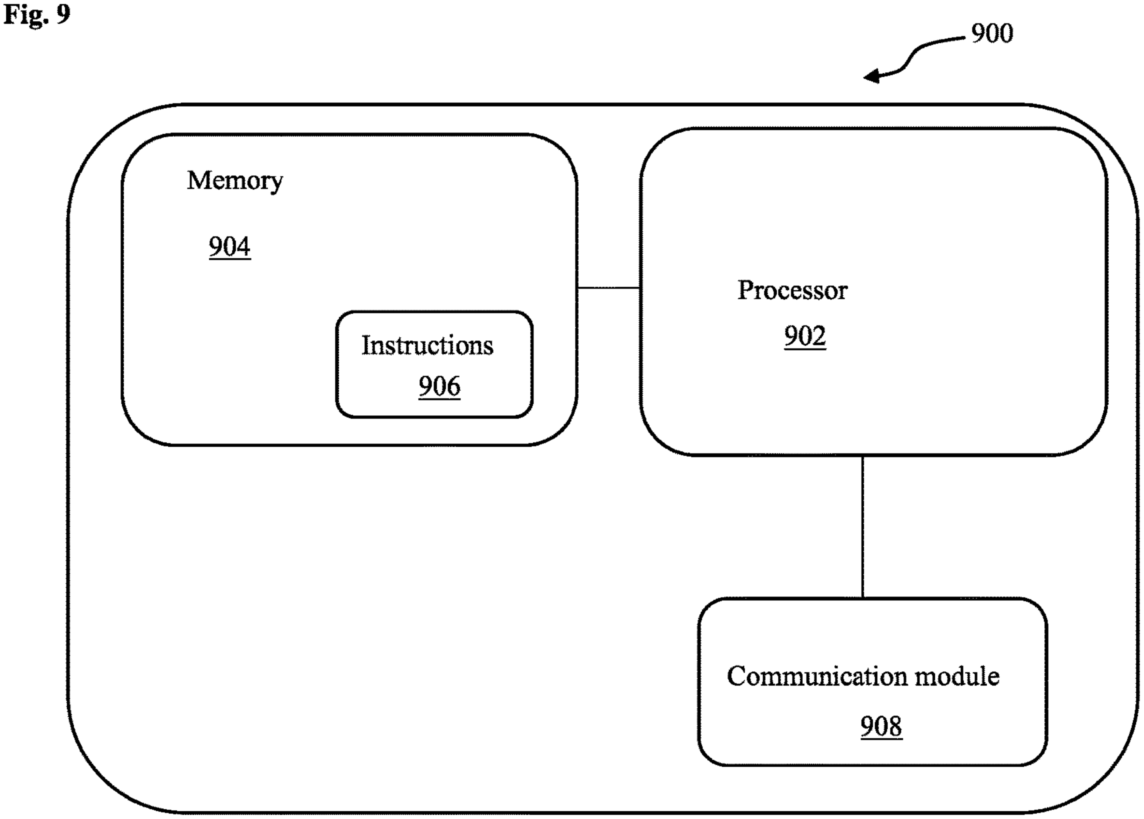
FIG. 9 is a schematic view of a system according to arrangements of the present disclosure.

With reference to FIG. 9, an example system 900 for performing the functions of the system 200 will now be described. The system 900 may comprise one or more processors 902 and one or more computer readable storage mediums 904 accessible to one or more of the processors 902, the computer readable storage mediums storing instructions 906 configured to be executed by one or more of the processor 902 in order to perform the functions of the system 200 described above. The first and second medical images $I_1$, $I_2$ may be stored in the one or more computer readable storage mediums 904 to be used by the system 200. Additionally, or alternatively, the system 900 may comprise a communication module 908 operatively coupled to the one or more processors 902 and/or the one or more storage mediums 904 by which the system 900 may receive the first and second medical images $I_1$, $I_2$, e.g. from an imaging apparatus.

In the example system 900 depicted in FIG. 9, the one or more processors 902, one or more computer readable storage mediums 904 and the communication module 908 are co-located, e.g. as part of an integrated apparatus, such as an imaging apparatus or workstation. However, in other arrangements one or more of the processors 902 and/or one or more of the computer readable storage mediums 904 may be located remotely from others of the processors 902 and/or computer readable storage mediums 904. For example, one or more of the processors 902 and/or computer readable storage mediums 904 may be located at a data center. In some arrangements, the system 900 may be facilitated using a cloud computing system.

Figure 10:
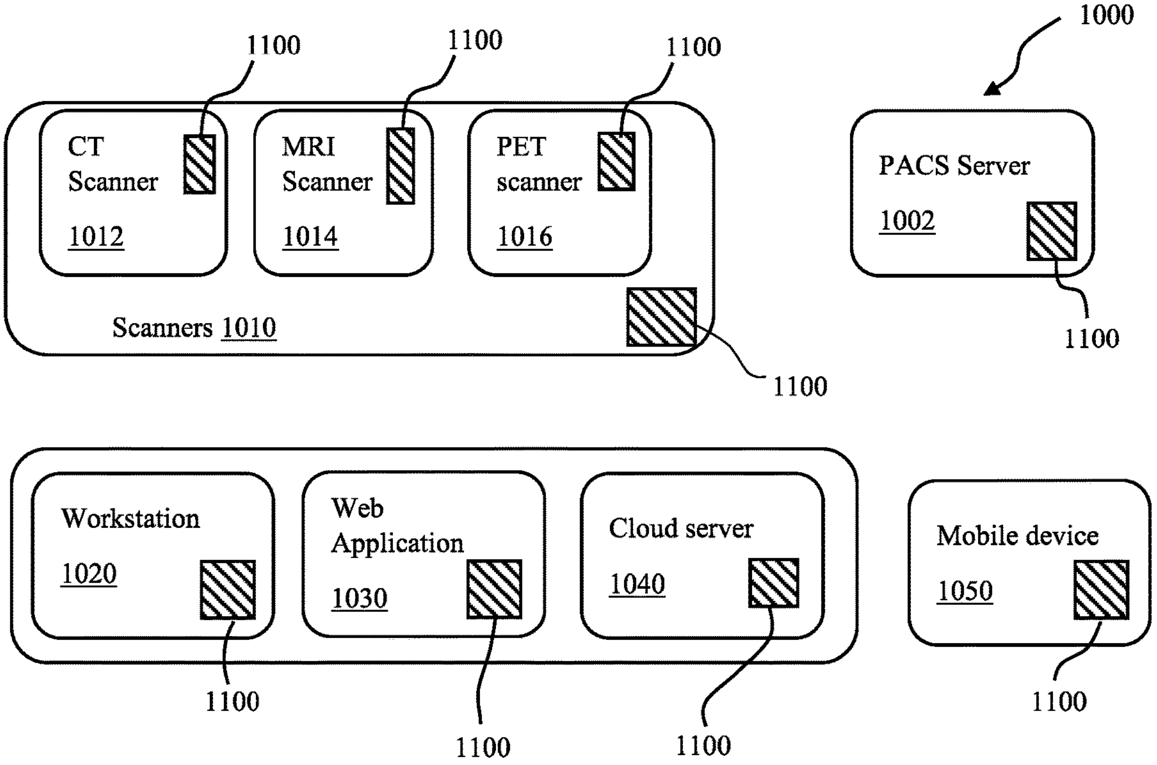
FIG. 10 is a schematic view of another system according to arrangements of the present disclosure.

With reference to FIG. 10, a system 1000 according to another arrangements of the disclosure will now be described. The system 1000 may comprise a Picture Archiving and Communication System (PACS) server 1002 configured to received images from one or more imaging systems, e.g. scanners, 1010. For example, in the arrangement depicted in FIG. 10, the system comprises a CT scanner 1012, an MM scanner 1012 and a PET scanner 1014. The imaging systems may be operatively connected to the PACS server. In other arrangements, one or more other scanners or imaging systems may be provided within the system in addition to, or instead of, one or more of the imaging systems shown in FIG. 10. In further arrangements, one or more of the imaging systems may be omitted.

The system 1000 may further comprise one or more workstations 1020 and/or one or more computing devices hosting one or more web applications 1030, which may be operatively connected to the PACS server 1002 and/or the imaging devices 1010. As indicated at 1100, one or more of the component devices of the system 1000 may comprise the system 900 or may be otherwise configured to perform the functions of the system 900, e.g. using software provided at least partially on the component. The component devices of the system 1000 may be configured to perform the functions, e.g. all of the functions, of the system 900 independently. In some arrangements, the component devices of the system 1000 may be configured to operate together with other component devices of the system, e.g. in a client/server mode, to perform the functions of the system. In some arrangements, the functions of the system 900 may be performed by a plurality of microservices operating on one or more of the component devices of the system 1000.

The system 1000 may further comprise, or be operatively connected to, a cloud computing server 1040, which may comprise the system 900 or be configured to perform one or more the functions of the system 900, e.g. independently of, or in conjunction with, the other component devices of the system 1000. The cloud server 1040 may be operatively connected to the PACS server 1002. Additionally or alternatively, the cloud server 1040 may be operatively connected to other component devices of the system 1000. In some arrangements, the cloud server 1040 may be configured to host the web application 1030.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A computer-implemented segmentation method, the method comprising:

performing a first automated segmentation operation on one or more first images of a subject area to automatically determine a first segmentation map of the subject area, wherein the one or more first images are generated using a first technique;

performing, at least partially based on the first segmentation map, a second automated segmentation operation on one or more second images of the subject area to automatically determine a second segmentation map of the subject area, wherein the one or more second images of the subject area are generated using a second technique different from the first technique, and the first technique and the second technique capture different properties of the subject area;

automatically determining (i) a mismatch between segmented portions of the first segmentation map and the second segmentation map, and (ii) a rate of change of the mismatch, wherein the second segmentation map is determined using a region growing procedure to grow regions around seed locations within one or more regions of interest, based on one or more predetermined region growing criteria.

2. The method of claim 1, wherein performing the first automated segmentation operation further comprises:

automatically applying one or more thresholds to:

values of pixels within the one or more first images; or values of elements within one or more maps determined based on the one or more first images, to determine a plurality of zones within the one or more first images or the one or more maps, the plurality of zones corresponding to different time to maximum properties using the first technique; and providing the plurality of zones of the one or more first images or the one or more maps as separate inputs to a procedure for determining the first segmentation map.

3. The method of claim 1, wherein the determination of the second segmentation map of the subject area comprises:

identifying the one or more regions of interest within the one or more second images at least partially based on the first segmentation map; and selectively utilizing information specifying the identified one or more regions of interest in the second automated segmentation operation to automatically determine the second segmentation map of the subject area.

4. The method of claim 1, wherein the seed locations are selected at least partially based on at least one of information within or derived from at least one of the one or more first images or the one or more second images at the seed locations.

5. The method of claim 1, wherein generating an estimated second segmentation map comprises:

selecting a plurality of seed locations; and expanding regions around the seed locations to identify segmented portions using a reinforcement learning model.

6. The method of claim 1, wherein a first image of the one or more first images is a perfusion weighted image, and wherein the first automated segmentation operation is performed to segment a portion of the subject area comprising a lesion, captured within the perfusion weighted image.

7. The method of claim 1, wherein a second image of the one or more second images is a diffusion weighted image, wherein the second automated segmentation operation is performed to segment a portion of the subject area comprising an infarction captured within the diffusion weighted image.

8. The method of claim 1, further comprising:

predicting a rate of change of a segmented region within at least one of the first segmentation map or the second segmentation map over time based on the one or more first images, the one or more second images, the first segmentation map, and the second segmentation map; and generating a timeline of predicted change of the segmented region.

9. The method of claim 8, further comprising:

generating a timeline of the rate of change of the mismatch.

10. The method of claim 1, further comprising:

determining a first map of a first property within the subject area based on the one or more first images, wherein the first automated segmentation operation is performed based on the first map.

11. A non-transitory computer readable medium storing instructions which, when executed by one or more processors, cause the one or more processors to:

perform a first automated segmentation operation on one or more first images of a subject area to automatically determine a first segmentation map of the subject area, wherein the one or more first images are generated using a first technique;

perform, at least partially based on the first segmentation map, a second automated segmentation operation on one or more second images of the subject area to automatically determine a second segmentation map of the subject area, wherein the one or more second images of the subject area are generated using a second technique different from the first technique, and the first technique and the second technique capture different properties of the subject area;

automatically determine (i) a mismatch between segmented portions of the first segmentation map and the second segmentation map, and (ii) a rate of change of the mismatch, wherein the second segmentation map is determined using a region growing procedure to grow regions around seed locations within one or more regions of interest, based on one or more predetermined region growing criteria.

12. An image segmentation system, the system comprising:

a processor and a memory storing computer readable instructions which, when executed by the processor cause the processor to:

perform a first automated segmentation operation based on one or more first images of a subject area to automatically determine a first segmentation map of the subject area, wherein the one or more first images are generated using a first technique;

perform, at least partially based on the first segmentation map, a second automated segmentation operation based on one or more second images of the subject area to automatically determine a second segmentation map of the subject area, wherein the one or more second images of the subject area are generated using a second technique different from the first technique, the first technique and the second technique capture different properties of the subject area;

automatically determine (i) a mismatch between segmented portions of the first images and the second images based on the first segmentation map and the second segmentation map, and (ii) a rate of change of the mismatch; and output the determined mismatch to a user of the system, wherein determination of the second segmentation map comprises using a region growing procedure to grow regions around seed locations within one or more regions of interest, based on one or more predetermined region growing criteria.

13. The system of claim 12, wherein the memory further stores instructions which, when executed by the processor, cause the processor to:

predict a rate of change of a segmented region within at least one of the first segmentation map or the second segmentation map over time based on the one or more first images, the one or more second images, the first segmentation map, and the second segmentation map; and generate a timeline of predicted change of the segmented region.

14. The system of claim 13, wherein the memory further stores instructions which, when executed by the processor, cause the processor to:

output the mismatch and the rate of change of the mismatch to a user of the system.

15. The non-transitory computer readable medium of claim 11, wherein, to perform the first automated segmentation operation, the instructions, when executed by the one or more processors, further cause the one or more processors to:

automatically apply one or more thresholds to:

values of pixels within the one or more first images, or values of elements within one or more maps determined based on the one or more first images, to determine a plurality of zones within the one or more first images or the one or more maps, the plurality of zones corresponding to different time to maximum properties using the first technique; and provide the plurality of zones of the one or more first images or the one or more maps as separate inputs to a procedure for determining the first segmentation map.

16. The non-transitory computer readable medium of claim 11, wherein, to perform the second automated segmentation operation at least partially based on the first segmentation map, the instructions, when executed by the one or more processors, further cause the one or more processors to:

identify the one or more regions of interest within the one or more second images at least partially based on the first segmentation map; and selectively utilize information specifying the identified one or more regions of interest in the second automated segmentation operation.

17. The non-transitory computer readable medium of claim 11, wherein the seed locations are selected at least partially based on at least one of information within or derived from at least one of the one or more first images or the one or more second images at the seed locations.

18. The non-transitory computer readable medium of claim 11, wherein, to generate the second segmentation map, the instructions, when executed by the one or more processors, further cause the one or more processors to:

select a plurality of seed locations; and expand regions around the seed locations to identify segmented portions using a reinforcement learning model.

19. The non-transitory computer readable medium of claim 11, wherein a first image of the one or more first images is a perfusion weighted image, and wherein the first automated segmentation operation is performed to segment a portion of the subject area comprising a lesion, captured within the perfusion weighted image.

20. The non-transitory computer readable medium of claim 11, wherein a second image of the one or more second images is a diffusion weighted image, wherein the second automated segmentation operation is performed to segment a portion of the subject area comprising an infarction captured within the diffusion weighted image.

* * * * *